United States Patent Office 2,961,382
Patented Nov. 22, 1960

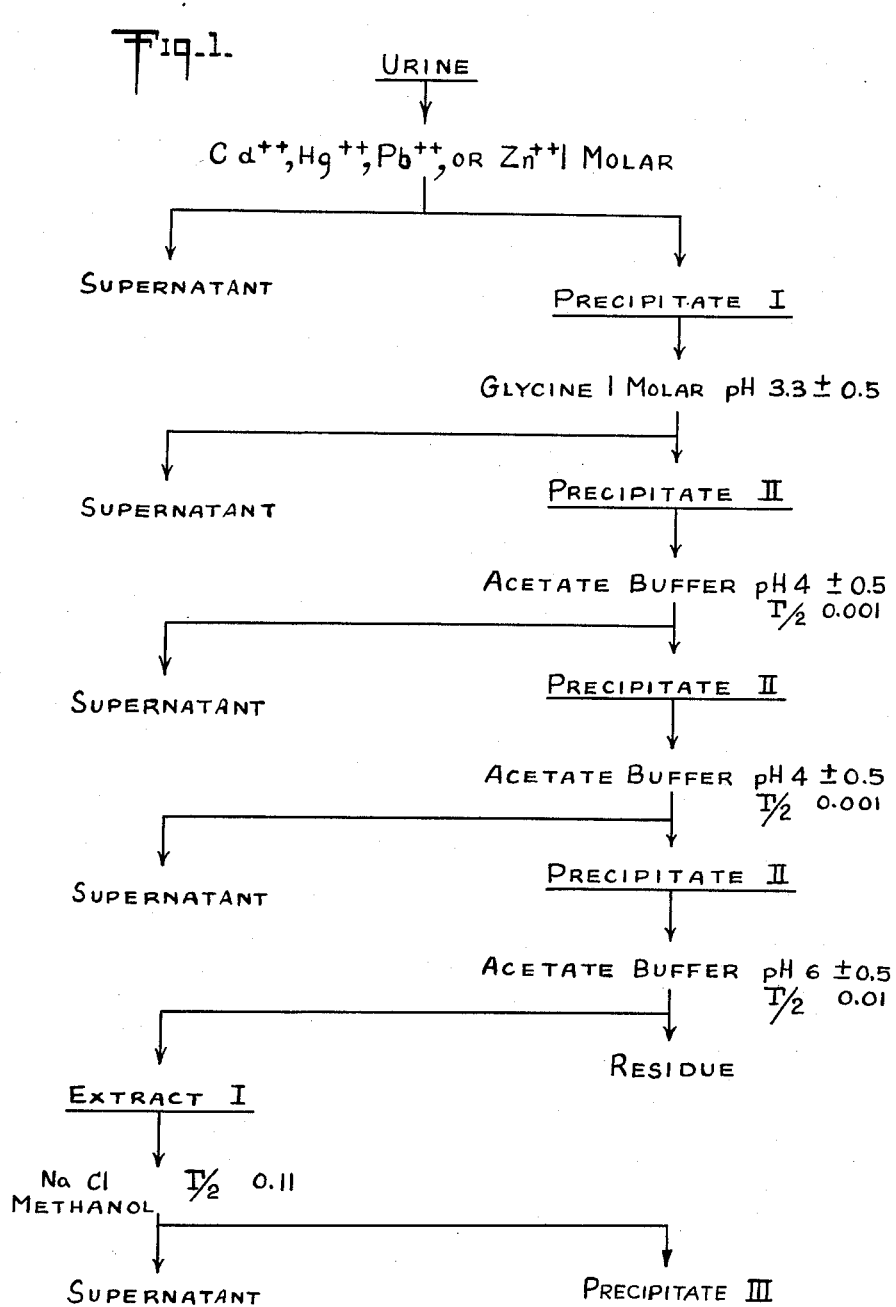

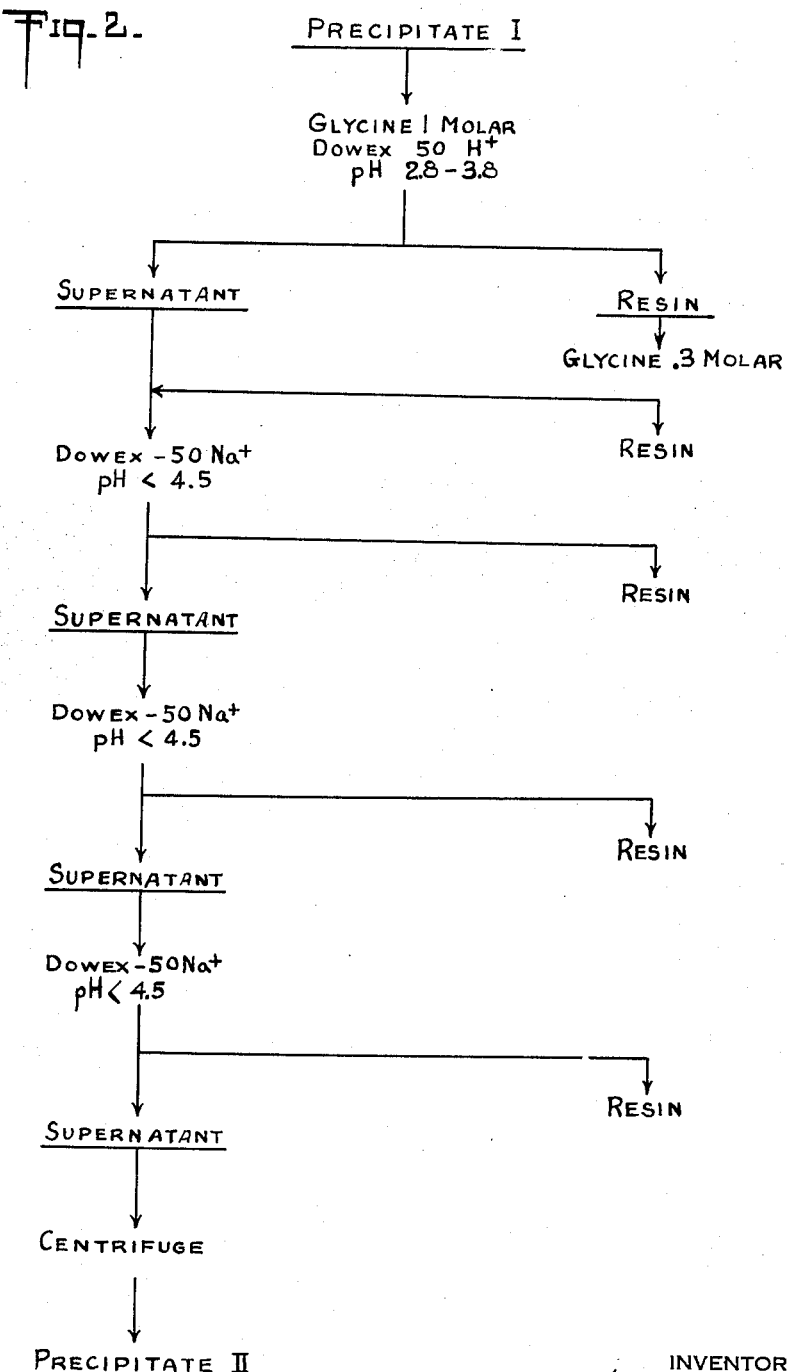

2,961,382

UROKINASE—A PLASMIOGEN ACTIVATOR AND METHODS OF OBTAINING THE SAME

Heron O. Singher, Plainfield, and Leo Zuckerman, Bound Brook, N.J., assignors to Ortho Pharmaceutical Corporation, a corporation of New Jersey Filed July 25, 1957, Ser. No. 674,079

4 Claims. (Cl. 195—68)

This invention relates to new and useful purified urokinase and urokinase products that are derived from mammalian urine and to methods for obtaining the same. More particularly the invention relates to new urokinase and urokinase products which are essentially free of inhibitors and other undesired products present in or derived from urine.

It is known that a factor called profibrinolysin exists in blood or blood serum or plasma which is capable in the presence of another factor, produced during growth of hemolytic streptococci, of dissolving fibrin. The inactive profibrinolysin is apparently an inactive enzyme (proenzyme), which is activated by the presence of the activator or co-factor to form a fibrinolytic product capable of dissolving blood clots or fibrin called fibrinolysin.

It is also known that instead of using bacterial filtrates such as staphylokinase or streptokinase, the inactive profibrinolysin can be activated by treatment with tissue extracts—fibrinolysokinase—and various organic solvents and compounds to give a fibrinolytic product which attacks the coagulation proteins. The presence in urine of an activator of both human and animal profibrinolpsin (urokinase) hase been demonstrated by several investigators, but separation of the profibrinolysin activator from inhibitors that are also present in the urine presented difficulties.

Urokinase has been purified by adsorption on silicic acid and elution with 4 percent ammonia. Further purification has been achieved by adsorption on a carboxylic acid cation exchanger equilibrated at pH 6.2. It has been observed that if urine is subjected to a simple shaking procedure, urokinase is concentrated in the foam. By separating this foam, an average recovery of over 70 percent of the urokinase is obtained. This amounts to a 19-fold increase in concentration. The separation of the profibrinolysin activator urokinase from inhibitors that are also present in urine remained a problem. One reason for this is urokinase is easily destroyed by heat.

It is an object of the present invention to provide new and improved urokinase and urokinase products which are highly active and essentially free of inhibitors. A further object is to provide methods whereby new and improved products can be obtained by simple and direct procedures.

The above mentioned and other objects of the invention are realized by precipitating urokinase from urine with heavy metal ions such as cadmium, mercury, lead, or zinc ions. The heavy metal ions are removed from the precipitate. The precipitate is then washed and the active factor extracted with a buffer solution. Urokinase is precipitated from this extract with alcohol or acetone.

Figure I is a diagrammatic representation of one method of obtaining urokinase from urine according to the present invention.

Figure II is a diagrammatic representation of an alternative method of separating the heavy metal ions from the first precipitate which contains urokinase.

Referring now to Figure I, a water soluble heavy metal salt such as zinc acetate is added to human urine to a concentration of 20 millimoles. The precipitate so obtained is separated by filtration or centrifugation. The precipitate is then suspended in an equal amount of one molar glycine and the pH adjusted to 3.8 to 2.8 (preferably a pH of 3.2) with acid. This solution removes zinc ions from the precipitate, identified in Figure I as precipitate I. If the pH of this solution is above 3.8, the zinc ions will not be separated from the protein. If the pH is below 2.8, the yield and purity of active component will be diminished. After stirring for at least an hour, a precipitate is separated by centrifugation which precipitate is essentially free of zinc ions. This precipitate is identified in Figure I as precipitate II.

In the alternative procedure illustrated by the flow diagram of Figure II, the zinc is removed by suspending the precipitate I in one-half its weight of a one molar glycine solution. To this suspension is added the hydrogen ion form of a cation exchange resin. Dowex–50, a sulfonated copolymer of styrene and divinyl benzene may be used. Another exchange resin that is equivalent to Dowex–50 for our purpose is Nalcite HCR.

The weight of Dowex–50 added to the suspension is one-half the weight of precipitate I. This mixture is stirred until a pH between 2.8 and 3.8 is obtained. The supernatant liquid is poured off and the exchange resin washed with 0.3 molar aqueous glycine. The combined supernatant and wash liquids are next mixed with Dowex-50 in the sodium ion form. The amount of sodium ion exchange resin added at this time is approximately one-fourth of the original weight of prepicitate I and the pH is kept under 4.5. The supernatant from this resin treatment is treated two more times in the same manner with equal quantities (one fourth the original weight of precipitate I) of Dowex–50 in the sodium ion form. The final supernatant is poured off the resin and centrifuged. The precipitate, identified as precipitate II in Figure II is free of heavy metal ions and may be further processed as indicated by the flow diagram of Figure I.

Referring again to Figure I, the precipitate II is washed several times with an acidic buffer solution having an ionic strength of 0.001 and adjusted to a pH of 4±0.5. This buffer solution is prepared by dissolving 0.082 gram of anhydrous sodium acetate and 0.3 ml. of glacial acetic acid in one liter of water. The washed precipitate II is then extracted with an acetate buffer solution having a pH of 6±0.5 and an ionic strength of 0.01. The extracting solution is prepared by dissolving 0.82 gram of sodium acetate and 0.03 ml. of glacial acetic acid in one liter of water. To this solution is added sufficient 1 N sodium hydroxide solution to give a final pH of about 6.0 (about 4 ml.). If the pH of the extracting solution is above 6.5, the purity of the product will be adversely affected. If the pH is below 5.5, it will not elute all of the active component. The extract I contains urokinase and may be lyophilized or further purified.

For purification the extract is adjusted to an ionic strength of 0.1 to 0.2 with sodium chloride, chilled, and cold alcohol is added until a precipitate forms. This occurs in the range of 35–80% alcohol concentration. The alcohol precipitate is then lyophilized. The following example is illustrative of the process and product of the present invention but is not to be construed as limiting.

*Example I.—Urokinase isolation*

Human male urine is collected for five days and stored under toluene in the refrigerator. To 110 liters is added 2.2 liters one molar zinc acetate solution and a precipitate forms (precipitate I). The mixture is left in the refrigerator for two days. Precipitate I is then collected in a Sharples centrifuge and stored in the refrigerator; the supernatant is discarded.

The precipitate I paste, 1120 grams, is suspended in 1120 ml. of 1.0 molar aqueous glycine solution. The pH is adjusted to 3.3 and the mixture is stirred about two hours. The suspension is then bucket centrifuged and the supernatant discarded.

The solids left in the centrifuge bottles (precipitate II) are washed with 3800 ml. pH 4 acetate buffer, ionic strength 0.001. This wash solution may be prepared by adding 2 ml. of 10 N acetic acid and 1 ml. of 4 N sodium acetate to water for a final volume of 4000 ml. Precipitate II is washed a second time with 3800 ml. buffer to which had been added 50 ml. 1 N acetic acid. The washed precipitate II is then extracted with 2000 ml. pH 6 acetate buffer, ionic strength 0.01. The extracting solution may be prepared by adding 5 ml. of 4 N sodium acetate and 1 ml. 1 N acetic acid to water. This solution is adjusted to pH 6 with 80 ml. of 1 N sodium hydroxide and the final volume brought up to 2000 ml.

The extract (extract I) amounts to 1700 ml., and is brought to an ionic strength of 0.11 with 15.3 grams sodium chloride. The solution is chilled to 0° C. and 3400 ml. methanol at −20° C. was added. Precipitate III separates out in 15 minutes. The mixture is left at −5° C. overnight and precipitate III may then be separated by bucket centrifuge at −5° C. Precipitate III is suspended in water and lyophilized. The powder weighs 3.7 grams. The yield is, therefore, 33.6 mg. per liter of urine.

The urokinase so obtained is non-dialyzable; that is, it will not pass through a dialysis membrane. The diphenylamine test indicates that this product contains mucoprotein.

Ultracentrifugal analysis indicates the presence of two components in urokinase prepared by the method of Example I. Electrophoretic analysis also indicates two components. At pH 7, component I has a mobility of $4.16 \times 10^{-5}$ and component II, $6.24 \times 10^{-5}$. The isoelectric points are in the vicinity of pH 4.5.

The urokinase prepared as described in Example I had one unit per 27 micrograms of protein as compared to streptokinase, which had one unit of activity per 0.08 microgram of protein. The units of activity are those described by L. R. Christensen in his article "Methods of Measuring the Activity of Components of the Streptococcal Fibrinolytic System and Streptococcal Desoxyribonuclease," Journal of Clinical Investigation, 28, 163 (1949).

What is claimed is:

1. Method for obtaining urokinase which comprises adding a heavy metal ion selected from the group consisting of cadmium, mercury, lead, and zinc to mammalian urine, removing the heavy metal ions from the precipitate so formed by suspending the precipitate in a 1 M glycine solution at a pH between about 2.8 and 3.8, separating the precipitate and washing with an acetate buffer solution having an ionic strength of about 0.001 and a pH between about 3.5 and 4.5, extracting the precipitate with an aqueous buffer solution having a pH between about 5.5 and 6.5 and an ionic strength of about 0.01, and precipitating urokinase from the extract.

2. Method for obtaining urokinase which comprises treating mammalian urine with a 1 M solution of zinc acetate to form a precipitate; extracting the precipitate with a 1 M aqueous solution of glycine at a pH between 2.8 and 3.8 to remove zinc ions, washing the precipitate with an aqueous acetate buffer solution at a pH between 3.5 and 4.5 and an ionic strength of about 0.001; extracting the washed precipitate with an aqueous acetate buffer having an ionic strength of 0.01 and a pH between 5.5 and 6.5; separating the extract from the precipitate, adding sodium chloride to the extract to obtain an ionic strength of about 0.1, and adding methanol to the extract at temperatures below 0° C. to obtain a precipitate that is essentially pure urokinase.

3. Method for obtaining urokinase which comprises treating mammalian urine with a heavy metal ion selected from the group consisting of cadmium, mercury, lead and zinc, to form a precipitate; suspending the precipitate in a glycine solution to which is added a cation exchange resin, decanting the supernatant and centrifuging to precipitate a urokinase concentrate; washing the urokinase concentrate with an acetate buffer solution having an ionic strength of about 0.001 and a pH between about 3.5 and 4.5, extracting the precipitate with an aqueous buffer solution having a pH between about 5.5 and 6.5 and an ionic strength of about 0.01, and precipitating urokinase from the extract.

4. Method for obtaining urokinase which comprises treating mammalian urine with a heavy metal ion selected from the group consisting of cadmium, mercury, lead and zinc, to form a precipitate; adsorbing the heavy metal from the precipitate with a cation exchange resin; extracting the residue that is not adsorbed on the exchange resin with an aqueous buffer solution having a pH between about 5.5 and 6.5 and an ionic strength of 0.001 and precipitating urokinase from the extract.

References Cited in the file of this patent

UNITED STATES PATENTS 2,253,124　　Hartmann et al. _____ Aug. 19, 1941

OTHER REFERENCES

Am. J. Physiology, vol. 171 (1952), page 768.
Blood Cells and Plasma Proteins, by Tullis, Academic Press, New York, 1953, page 41.
J. Lab. Clin. Medicine, vol. 44 (1954), page 944.
Arch. Biochem. Biophysics, vol. 62 (June 1956), pp. 500–501.